(12) United States Patent
Lieuwen

(10) Patent No.: US 6,353,835 B1
(45) Date of Patent: Mar. 5, 2002

(54) TECHNIQUE FOR EFFECTIVELY MAINTAINING MATERIALIZED VIEWS IN A DATA WAREHOUSE

(75) Inventor: Daniel Francis Lieuwen, Plainfield, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/128,445

(22) Filed: Aug. 3, 1998

(51) Int. Cl.$^7$ ............................................... G06F 12/00
(52) U.S. Cl. ............................................. 707/203; 714/1
(58) Field of Search ................................. 707/203, 1–3; 714/1

(56) References Cited

U.S. PATENT DOCUMENTS 5,897,632 A * 4/1999 Dar et al. ........................ 707/2

OTHER PUBLICATIONS

D. Quass et al., "On–Line Warehouse View Maintenance," Pro. Sigmod, May 1997.*
D. Quass et al., "On–Line Warehouse View Maintenance," Proc. SIGMOD, May 1997, pp. 393–404.
H. Jagadish et al., "Scalable Versioning in Distributed Databases with Commuting Updates," Proc. Data Eng., Apr. 1997, pp. 520–531.
T. Griffin et al., "Incremental Maintenance of Views with Duplicates," Proc. SIGMOD, Jun. 1995, pp. 328–339.
T. Griffin et al., "A Framework for Using Redundant Data to Optimize Read–Intensive Database Applications," Proc. Int'l Workshop on Real–Time Databases, Sep. 1997.
P. Bohannon et al., "Logical and Physical Versioning in Main Memory Databases," Proc. VLDB, Aug. 1997.
A. Kawaguchi et al., "Concurrency Control Theory for Deferred Materialized Views," Proc. ICDT, Jan. 1997.
P. Bober et al., "On Mixing Queries and Transactions via Multiversion Locking," Proc. Data Eng., Feb. 1992, pp. 535–545.
C. Mohan et al., "Efficient and Flexible Methods for Transient Versioning of Records to Avoid Locking by Read–Only Transactions," Proc. SIGMOD, Jun. 1992, pp. 124–133.

* cited by examiner

Primary Examiner—Hosain T. Alam
Assistant Examiner—Jean Bolte Fleurantin

(57) ABSTRACT

In a data warehouse, materialized views are maintained to provide the latest versions thereof. A reader may initiate a reader session where a series of queries are issued against one or more of the views. However, an information inconsistency problem may arise when responses to the queries in the reader session are based on certain common underlying data in the views which is subject to an update by a maintenance transaction. To avoid the information inconsistency problem, each time when a maintenance transaction is performed to update a view, it is executed on a copy of the view, rather than the original view itself to which queries of on-going reader sessions are directed. After the maintenance transaction, the updated copy becomes the current version of the view to which queries of new reader sessions are directed.

37 Claims, 1 Drawing Sheet

TECHNIQUE FOR EFFECTIVELY MAINTAINING MATERIALIZED VIEWS IN A DATA WAREHOUSE

FIELD OF THE INVENTION

The invention relates to database systems and methods, and more particularly to a system and method for maintaining materialized views in a data warehouse and providing information in response to queries against the views.

BACKGROUND OF THE INVENTION

As is well known, a data warehouse integrates information from one or more data sources into a database, which can be queried by clients or readers of the warehouse to extract useful information. The data warehouse typically includes materialized views, which are subsets of the database and are provided to speed up query processing as the readers can selectively work with, rather than the whole database itself, only those views suitably formatted for the readers' particular queries.

As changes are made to certain data at the sources, the materialized views incorporating the previous version of such data become outdated. In response to the data changes, the data warehouse performs view maintenance to update the views. The view maintenance typically involves queuing the changes in the source data, and periodically running a batch update transaction, known as a "maintenance transaction," to refresh the materialized views. It should be noted that the periodic maintenance transactions typically are the only write-transactions at the warehouse, and all other transactions performed at the warehouse are read-only queries by the readers.

However, an "information inconsistency" problem arises when a maintenance transaction is allowed to be performed during a reader session where a reader issues a series of queries, responses to which are based on certain common underlying data subject to the update by the maintenance transaction. That is, the information inconsistency problem arises when the response to a first query by the reader is based on a first version of the underlying data before the update, and the response to a second query by that reader is based on a second version of the same underlying data after the update. Such an "information inconsistency" problem is particularly troublesome when the reader relies on the series of queries to perform an analysis requiring a consistent database state, which is common. Such an analysis is undesirably frustrated when the same underlying data changes from query to query.

Data in materialized views are stored in the form of tuples. The prior art approaches to affording information consistency typically avoid use of conventional two-phase locking algorithms, which require a reader to block any maintenance transaction when the reader attempts to read a tuple, and a maintenance transaction to block any reader when the transaction attempts to modify a tuple. This stems from the fact that such algorithms employ locks, e.g., read-locks and write-locks, to effect the blocking which are computationally expensive, and the reader session and maintenance transaction typically are long-running and access significant portions of the views, thereby undesirably triggering blocking frequently. As a result, a typical analysis involving numerous queries can hardly be effectively realized using the conventional locking algorithms.

A prior art approach avoiding use of locks requires that reader sessions take place only during the daytime while maintenance transactions are executed during the nighttime. However, as corporations become globalized, there is no longer any nighttime common to all corporate entities around the world during which it is convenient to make the data warehouse unavailable to readers. In addition, since the maintenance transactions must be completed by the following morning, the time available for view maintenance can be a limiting factor in both the number and size of the views that can be materialized at the warehouse.

However, in another prior art approach, a maintenance transaction is allowed to be executed on a materialized view concurrently with reader sessions utilizing the same view. For details on this approach, one may refer to: D. Quass et al., "On-Line Warehouse View Maintenance," Proc. SIGMOD, May 1997, pp. 393–404. Each tuple in the view contains multiple fields. The Quass et al. approach involves identifying those "mutable" fields in the tuple which are subject to an update as their data varies from time to time. During an update, to avoid the information inconsistency problem, a maintenance transaction overwrites the mutable fields if no reader is reading them. Otherwise, an updated version of the mutable fields is stored in spare memory space allocated to the view within the tuple, thereby creating multiple versions of the mutable fields in the view. In effect, each version of the mutable fields corresponds to a version of the view, and the multiple versions of the view corresponding to the multiple versions of the mutable fields are inextricably integrated with one another, and stored in the same memory space pre-assigned to the view. Queries of new reader sessions after the update are directed to the updated version of the mutable fields while queries of the on-going sessions continue to be directed to the earlier versions corresponding thereto.

SUMMARY OF THE INVENTION

While the Quass et al. approach described above is desirable in that it allows a maintenance transaction to be performed on a materialized view concurrently with reader sessions utilizing the same view without incurring an information inconsistency problem, its implementation has been recognized by me to be complicated in both reader and maintenance transactions. In addition, if a significant portion of the materialized view needs to be modified in each update, the handling of queries from the reader sessions concurrent with the materialized view in accordance with the Quass et al. approach becomes computationally expensive, and thus inefficient. I have recognized that such inefficiency is attributed to its requirement of integrating multiple versions of the mutable fields in the same relation holding the materialized view.

The present invention solves the above-identified problem. In accordance with the invention, when data in a materialized view is updated, a maintenance transaction for the update generates a new version of the entire view, which includes the updated data. Multiple versions of the view corresponding to different updates coexist. However, in direct contrast to the Quass et al. approach where using the above-described mutable fields, multiple versions of a view are inextricably integrated with one another and stored in the same memory space pre-assigned to the view, the invention requires that each version of the view in its entirety be physically separate and stored in a discrete memory space. Each version of the view in accordance with the invention is identified by an index. A reader session is associated with the most recent version of the view identified by the index at the beginning of the session. Queries in the reader session which are directed to the view are rewritten so that the responses thereto are based on the version of the view associated with the reader session. To avoid the information inconsistency problem, the maintenance transaction updates the view using a copy of the most recent version thereof, without disturbing any on-going reader sessions utilizing the original version. The resulting updated version becomes the most recent version of the view to which queries of new sessions, after the maintenance transaction completes, are directed.

In accordance with an aspect of the invention, for a materialized view which contains a large number of tuples which are immutable except for those tuples which are recently added thereto, the view is divided into an append-only part which includes those immutable tuples, and a mutable part which includes the remaining, mutable tuples. Advantageously, the inventive methodology described above may be applied to the mutable part to update such a view to avoid the information inconsistency problem.

BRIEF DESCRIPTION OF THE DRAWING

The present invention will be more fully appreciated by consideration of the following detailed description, when read in light of the accompanying drawing in which.

DETAILED DESCRIPTION

Figure 1:
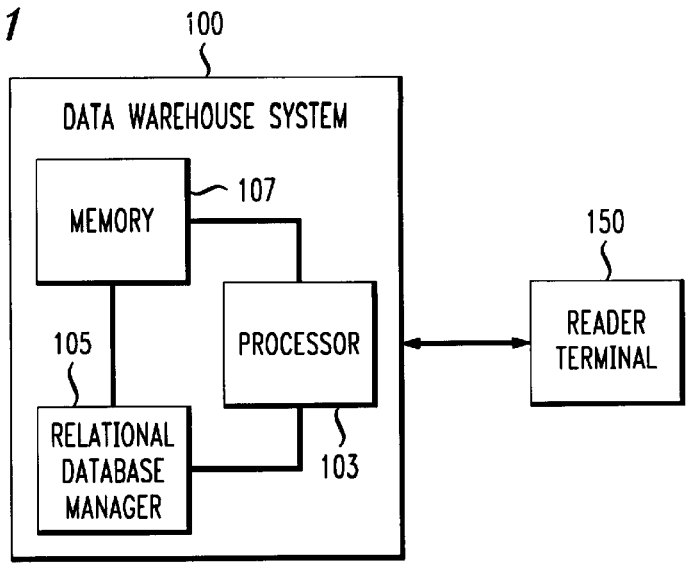
FIG. 1 illustrates an arrangement wherein a reader terminal may be used to access a data warehouse system in accordance with the invention to obtain certain information.

FIG. 1 illustrates data warehouse system 100 embodying the principles of the invention. As shown in FIG. 1, system 100 includes processor 103 whose functions are fully described below, and relational database manager 105 and memory 107, both of conventional design. In system 100, data from multiple sources is integrated into a database. This database includes materialized views, which are formed based on sales data provided by a chain of department stores and are stored in manager 105. For example, one such view is DailySales which is a summary table aggregating total daily sales by city and product line, and may be expressed as follows:

$$\text{DailySales(city, state, productLine, recordDate, totalSales),} \quad [1]$$

where (city, state, productLine, recordDate, totalSales) represents each tuple stored in the DailySales table; the fields "city" and "state" respectively indicate the city and state in which the department store to which the tuple pertains is located; the field "productLine" indicates the product line involved in the sales by such a department store; the field "recordDate" indicates the date of the sales; and the field "totalSales" indicates the aggregate amount of the sales. In this example, the DailySales table contains multiple days's worth of daily sales data. In addition, the customers of the stores are allowed to return a purchased item within a predetermined period, e.g., a week, from the record date of the purchase, and stores are allowed to correct their sales within a shorter period, e.g., three days, from the respective record dates thereof. As a result, tuples in the DailySales table whose recordDate is within the last predetermined period are mutable and subject to an update.

Materialized views such as the DailySales table which are subsets of the database, as opposed to the whole database itself, are used in data warehouse system 100 to speed up processing of queries. Materialized views also allow posing queries that could not be asked against any single one of the underlying databases that are integrated within the data warehouse. In any event, queries may be issued by different reader terminals including reader terminal 150 of conventional design against the database to extract useful information. For example, a department store analyst at terminal 150 may want to find out the total sales made by the stores on a per city basis. Accordingly, the analyst may use terminal 150 to issue the following query against DailySales, which is in accordance with the standard relational database programming language SQL:

SELECT city, state, SUM(totalSales)

FROM DailySales

GROUP BY city, state; [2]

For instance, if the response by system 100 to query [2] indicates that the sales of city=Cincinnati are much higher than what the analyst expects, the analyst may want to "drill down" and further investigate the Cincinnati sales by obtaining a breakdown thereof in each product line. Accordingly, the analyst may then issue the following query against DailySales through terminal 150:

SELECT productLine, SUM(totalSales)

FROM DailySales

WHERE city='Cincinnati' AND state='OH'

GROUP BY productLine; [3]

However, as sales data from the department stores changes, the materialized views including the DailySales table in system 100 incorporating the previous version of such data become outdated. In response to such a data change, processor 103 performs view maintenance to update the views in accordance with the invention. The view maintenance involves, among other things, queuing the changes in the sales data, and periodically running a batch update transaction, known as a "maintenance transaction," to refresh the materialized views.

An "information inconsistency" problem may arise when a maintenance transaction is allowed to be performed during a reader session where a reader terminal issues a series of queries, responses to which are based on certain common underlying data subject to the update by the maintenance transaction. Let's say in the above example the maintenance transaction involves an update on the Cincinnati sales data. The information inconsistency problem arises when the response to query [2] is based on a first version of the Cincinnati sales data before the update, and the response to query [3] is based on a second version of the same data after the update. As a result, for example, the sum of the Cincinnati sales broken down by product line which are returned by query [3] does not add up to the overall Cincinnati sales returned by query [2]. Thus, an analysis which normally requires a consistent database state is undesirably frustrated as the Cincinnati sales data changes from one query to another.

In accordance with the invention, when a maintenance transaction is performed by processor 103, the current views affected by the maintenance transaction are duplicated so that the original views continue to be used to serve any on-going reader sessions while the copy thereof is updated by the write-only maintenance transaction. Advantageously, the responses to the queries in the on-going reader sessions are consistently based on the same original views, thereby avoiding the information inconsistency problem. After the maintenance transaction, the updated copy of the views then becomes the current version thereof, to which queries of new reader sessions are directed.

In accordance with an aspect of the invention, each view in the database has a version number associated therewith. Specifically, a global variable, current, is stored as the only tuple in a table called VersionNum which records the current version number. When a new reader session begins, processor 103 starts a read-transaction to look up the current version number from VersionNum, stores the value in a local variable curr associated with the new reader session, and commits. Although this read-transaction requires a read-lock to temporarily block any update on current, the transaction is extremely brief and incurs virtually no blocking. In accordance with the invention, processor 103 rewrites the queries received in the reader session so that any view or table R mentioned in the FROM clause as in queries [2] and [3] above is replaced with $R_{curr}$ to ensure that the responses to the queries are based on the same, current version of the table. The queries, as rewritten, are submitted to relational database manager 105 which executes the rewritten queries in a conventional manner. Manager 105 then returns responses to the queries based on $R_{curr}$ to terminal 150 through processor 103.

Figure 2:
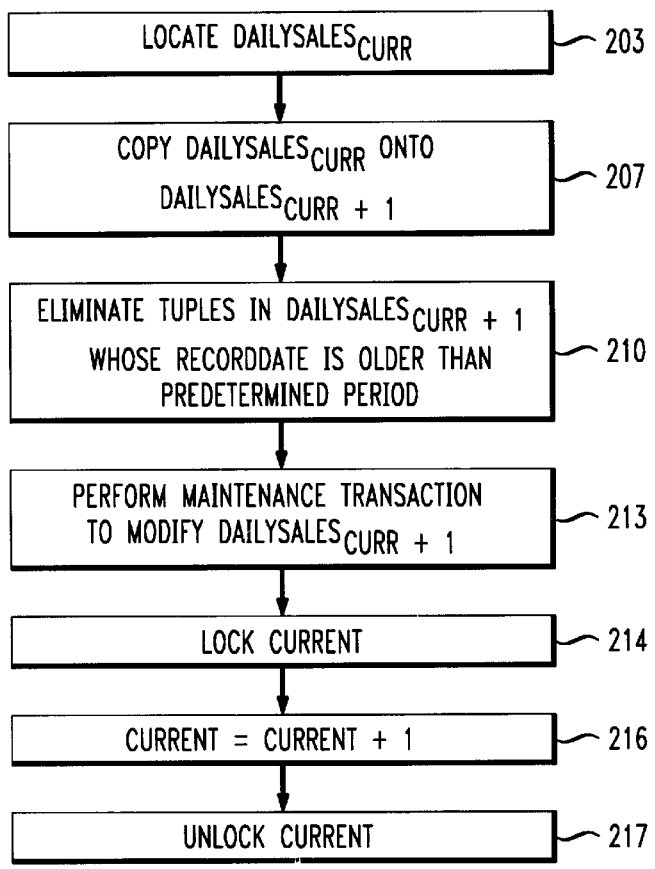
FIG. 2 is a flow chart depicting the steps of a routine in accordance with the invention used in the data warehouse system to update a materialized view therein.

Continuing the above example, the current version of the DailySales table, namely, $DailySales_{curr}$, is stored in manager 105. FIG. 2 illustrates routine 200 for maintaining DailySales in accordance with the invention. When a maintenance transaction involving DailySales is performed, instructed by routine 200 stored in memory 107, processor 103 locates the most recent version thereof, i.e., $DailySales_{curr}$, as indicated at step 203, where curr represents an integer. Processor 103 then at step 207 causes $DailySales_{curr}$ to be copied onto a new table $DailySales_{curr+1}$ which is to be the updated version of DailySales. In this instance, let's say the department store analyst is particularly interested in the daily sales of the stores within the last predetermined period, e.g., last week. As such, processor 103 is instructed to eliminate, at step 210, those tuples in $DailySales_{curr+1}$ whose recordDate is older than the predetermined period as they are no longer relevant. It should be noted that in practice, steps 207 and 210 may be combined into a single command, e.g., an SQL statement. Processor 103 then at step 213 performs the maintenance transaction to modify $DailySales_{curr+1}$ in accordance with the maintenance process described below, thereby updating the copy of $DailySales_{curr}$. After the maintenance transaction is completed, processor 103 at step 214 temporarily locks current to block reading thereof. At step 216, processor 103 increments current and, as a result, $DailySales_{curr+1}$ becomes the current version of DailySales to which queries of all new reader sessions are directed. Processor 103 then unlocks current, as indicated at step 217. It should also be noted that in practice, there may be more than one view other than DailySales requiring maintenance. In that case, each view needs to undergo steps similar to steps 203, 207, 210 and 213.

The aforementioned maintenance process will now be described. In accordance with the maintenance process, processor 103 starts a short transaction which reads current from VersionNum, stores the value of current in a local variable curr associated with the maintenance process, and commits. One or more maintenance transactions may be executed in the process, each of which reads/modifies a non-overlapping, or unrelated set of views or tables. After receiving a request U for updating a particular table R, e.g., DailySales, in a maintenance transaction, processor 103 copies $R_{curr}$ to $R_{curr+}$ as mentioned before. Processor 103 then rewrites the request U with R replaced by $R_{curr+1}$, and causes relational database manager 105 to execute the rewritten request, thereby updating the copy of $R_{curr}$. For each table $R'_{curr}$ which is not updated, processor 103 issues the following command to manager 105 to create $R'_{curr+1}$ which is a duplicate of $R'_{curr}$ but requires significantly less space than a copy:

$$\text{CREATE VIEW } R'_{curr+1} \text{ AS SELECT * FROM } R'_{curr} \quad [4]$$

If the copy operation eliminates old tuples, then the CREATE VIEW of [4] must be extended with a WHERE clause to do the same. After the maintenance transactions are completed, processor 103 executes a write-transaction to increment current by one. The maintenance process then comes to an end. Although the write-transaction for incrementing current requires a write lock to temporarily block any reading of current, the transaction is extremely brief and incurs virtually no blocking. With the incremented current value, queries of all new reader sessions after the maintenance process are accordingly directed to the updated versions of the views in the database. Existing reader sessions continue to read from the same versions of the views as they have been reading since they began.

It should be noted at this point that the application of the inventive methodology for maintaining materialized views described above is particularly advantageous where the materialized views need to be modified significantly from version to version. Examples of such materialized views include views such as DailySales providing summary data over a short period, tables containing data concerning business accounts having frequent transactions, etc.

However, the application of the inventive methodology may also be extended to those large fact tables which, although comprised of myriad tuples, require updates for only recent tuples therein. For example, the following PointOfSale table is one such table:

$$\text{PointOfSale(storeid, barcode, recordDate, price)} \quad [5]$$

where (storeid, barcode, recordDate, price) represents each tuple stored in the PointOfSale table; the field "storeid" identifies the store which makes the sale described by the tuple; the field "barcode" identifies the product involved in the sale; the field "recordDate" indicates the date of the sale; and the field "price" indicates the amount of the sale.

The PointOfSale table is a large fact table which contains years' worth of sales data, and to which new tuples concerning recent sales are appended periodically. However, this table is not a conventional "append-only" table because the recent tuples therein may need to be modified for a number of reasons. For example, the price of a sale may change after the sale due to a store policy providing for matching a lower price on the same purchased item found in an advertisement within a predetermined period, e.g., 30 days. A tuple in the PointOfSale table may need to be deleted due to a return of a purchased item within an allowed period, e.g., a week. Thus, the PointOfSale table in this example contains years of data where only last thirty-days' worth of data can possibly be modified.

For a fact table R like the PointOfSale table which is append-only except that the newly appended tuples can be modified for a limited time, in accordance with an aspect of the invention, such a fact table is divided into (1) a mutable part $R_{curr}$ in which each tuple is subject to an update by the maintenance process described above and (2) an append-only part $R_{app}$ in which each tuple does not change over time. Thus, in the above example, $R_{curr}$ of the PointOfSale table corresponds to those tuples therein having a record-Date within the past 30 days, and $R_{app}$ corresponds to the rest of the table. The mutable part $R_{curr}$ is handled by the inventive methodology described above similarly to DailySales$_{curr}$ to avoid the information inconsistency problem.

Specifically, in implementation, when the fact table R is created using the conventional command CREATE TABLE R, the latter is rewritten by processor 103 into two CREATE TABLE commands. The first creates $R_1$ by modifying R in the original command to $R_1$. (When $R_2$, $R_3$, . . . are created, they will have the same form as R and $R_1$.) The user is also required to specify an immutable field tupDate as one of the fields of R. This field may for instance be the time at which the tuple was created or the time at which the real world event, e.g., sale of an item, took place. The second CREATE TABLE creates $R_{app}$ by modifying the original command to change R to $R_{app}$ and by adding at least one field which contains a version number versNum. This version number allows those queries in a reader session reading the $n^{th}$ version of the fact table R to ignore the additional, appended tuples in the $m^{th}$ version thereof, where m>n. In addition, modifiableDuration must be specified for the period for R, e.g., 30 days, during which the tuple can be modified. Such specification may be accomplished by adding a tuple (R, modifiableDuration) to a special relation intended for this purpose.

In accordance with the invention, when reader terminal 150 issues a query against version curr=n of the fact table R, the query is rewritten by processor 103 against $R_{app}$ and $R_n$. For example, the following query issued by terminal 150:

SELECT list

FROM R1 r1, . . . ,Rk rk

WHERE condition; [6]

is rewritten by processor 103 as follows:

SELECT list

FROM ((SELECT * FROM R1$_{app}$' WHERE versNum<n) UNION ALL (SELECT * FROM R1$_n$)) r1, ((SELECT * FROM Rk$_{app}$' WHERE versNum<n) UNION ALL (SELECT * FROM Rk$_n$)) rk WHERE condition; [7]

where Rs$_{app}$' is a view of Rs$_{app}$ that excludes versNum and hence contains the same set of fields as Rs$_n$. It should be noted that GROUP BY and HAVING clauses are handled similarly to the SELECT and WHERE clauses with no rewriting necessary.

The maintenance process described above as applied to, e.g., DailySales, is equally applicable here except that the following copy operation:

INSERT INTO R$_{curr+1}$

SELECT * FROM R$_{curr}$ WHERE TodaysDate<=tupdate+modifiableDuration; [8]

is used in the maintenance process for the mutable part $R_{curr}$. It should be noted that TodaysDate in [8] representing today's date may either be inserted by the query rewriter explicitly, or implicitly using a function provided by system 100. Thus, using the copy operation [8], only tuples which are potentially mutable are included in $R_{curr+1}$. Those no longer mutable tuples which are not copied from $R_{curr}$ to $R_{curr+1}$ are appended to $R_{app}$, tagged with versNum=curr.

The foregoing merely illustrates the principles of the invention. It will thus be appreciated that a person skilled in the art will be able to devise numerous other arrangements which embody the principles of the invention and are thus within its spirit and scope.

For example, it will be appreciated that using the inventive arrangement, a reader will be able to direct a query against an old version of a materialized view which is indicated by its version number. In that case, for instance, a table is maintained in memory 107 where the version number of each version of the view is listed along with the corresponding time when the version was updated. The query may incorporate the desired time pertinent to the query. In response, processor 103 determines from the table the appropriate update time of the view which would satisfy the desired time required by the query, and looks up the corresponding version of the view on which the response to the query is based. Thus, this implements a "time travel" query.

Finally, system 100 is disclosed herein in a form in which various system functions are performed by discrete functional blocks. However, any one or more of these functions could equally well be embodied in an arrangement in which the functions of any one or more of those blocks or indeed, all of the functions thereof, are realized, for example, by one or more appropriately programmed processors.

I claim:

1. Apparatus for providing a response to at least one query in a session directed to an information source, which contains at least one immutable field, the apparatus comprising:
   a memory for providing an indicator indicating a version of the information source, the session being associated with a first version of the information source indicated by the indicator at a beginning of the session;
   a processor for modifying the query in the session directed to the information source to have the response based on the first version of the information source associated with the session; and
   a controller for updating the information source based on a copy of the first version of the information source, thereby generating a second version of the information source, the first version and the second version of the information source being stored in at least two distinct non-overlapping memory spaces, each of the first version and the second version of the information source containing a copy of the at least one immutable field, the indicator being changed to indicate the second version of the information source.

2. The apparatus of claim 1 wherein the discrete memory spaces are non-contiguous.

3. The apparatus of claim 1 wherein the information source includes a database.

4. The apparatus of claim 3 wherein the database includes at least one materialized view.

5. The apparatus of claim 4 wherein the at least one materialized view contains temporal data.

6. The apparatus of claim 1 wherein the indicator includes a numeral index.

7. The apparatus of claim 6 wherein the indicator is changed by incrementing the numeral index.

8. The apparatus of claim 1 where the processor includes the controller.

9. Apparatus for providing a response to at least one query in a session directed to an information source, the query including a reference to the information source, the apparatus comprising:
 a memory for providing an indicator indicating a version of the information source, the session being associated with a first version of the information source indicated by the indicator at a beginning of the session;
 a processor for modifying the query in the session directed to the information source to have the response based on the first version of the information source associated with the session, the query being modified to replace the reference to the information source with a second reference to the first version of the information source; and
 a controller for updating the information source based on a copy of the first version of the information source, thereby generating a second version of the information source, the first version and the second version of the information source being stored in at least two distinct non-overlapping memory spaces, the second reference indicating the memory space in which the first version of the information source is stored, the indicator being changed to indicate the second version of the information source.

10. An information system including at least one information source, which contains at least one immutable field, the system comprising:
 means for initiating a session in which at least one query is directed to the information source,
 means for providing a first version of the information source indicated by an indicator, the session being associated with the first version of the information source at a beginning of the session;
 means for providing a response to the query which is based on the first version of the information source associated with the session; and
 means for updating the information source based on a copy of the first version of the information source, thereby generating a second version of the information source, the first version and the second version of the information source being stored in at least two distinct non-overlapping memory spaces, each of the first version and the second version of the information source containing a copy of the at least one immutable field.

11. The system of claim 10 further comprising means for changing the indicator to indicate the second version of the information source.

12. The system of claim 10 wherein the discrete memory spaces are non-contiguous.

13. The system of claim 10 comprising a data warehouse system.

14. The system of claim 10 wherein the initiating means includes a reader terminal.

15. The system of claim 10 wherein the information source includes a database.

16. The system of claim 15 wherein the database includes at least one materialized view.

17. The system of claim 16 wherein the at least one materialized view contains temporal data.

18. The system of claim 10 wherein the indicator is derived from the query.

19. The system of claim 10 wherein the indicator includes selected time.

20. The system of claim 10 wherein the indicator includes a numeral index.

21. A method for providing a response to at least one query in a session directed to an information source, which contains at least one immutable field, the method comprising:
 providing an indicator indicating a version of the information source;
 associating the session with a first version of the information source indicated by the indicator at a beginning of the session;
 modifying the query in the session directed to the information source to have the response based on the first version of the information source associated with the session;
 updating the information source based on a copy of the first version of the information source, thereby generating a second version of the information source;
 storing the first version and the second version of the information source in at least two distinct non-overlapping memory spaces, each of the first version and the second version of the information containing a copy of the at least one immutable field; and
 changing the indicator to indicate the second version of the information source.

22. The method of claim 21 wherein the discrete memory spaces are non-contiguous.

23. The method of claim 21 wherein the information source includes a database.

24. The method of claim 23 wherein the database includes at least one materialized view.

25. The method of claim 24 wherein the at least one materialized view contains temporal data.

26. The method of claim 21 wherein the indicator includes a numeral index.

27. The method of claim 26 wherein the indicator is changed by incrementing the numeral index.

28. A method for providing a response to at least one query in a session directed to an information source, the query including a reference to the information source, the method comprising:
 providing an indicator indicating a version of the information source, the session being associated with a first version of the information source indicated by the indicator at a beginning of the session;
 modifying the query in the session directed to the information source to have the response based on the first version of the information source associated with the session, the query being modified to replace the reference to the information source with a second reference to the first version of the information source; and
 updating the information source based on a copy of the first version of the information source, thereby generating a second version of the information source, the first version and the second version of the information source being stored in at least two distinct non-overlapping memory spaces, the second reference indicating the memory space in which the first version of the information source is stored, the indicator being changed to indicate the second version of the information source.

29. A method for use in an information system including at least one information source, which contains at least one immutable field, the method comprising:
 initiating a session in which at least one query is directed to the information source;
 providing a first version of the information source indicated by an indicator;
 associating the session with the first version of the information source at a beginning of the session;
 providing a response to the query which is based on the first version of the information source associated with the session; and updating the information source based on a copy of the first version of the information source, thereby generating a second version of the information source, the first version and the second version of the information source being stored in at least two distinct non-overlapping memory spaces, each of the first version and the second version of the information source containing a copy of the at least one immutable field.

30. The method of claim 29 further comprising changing the indicator to indicate the second version of the information source.

31. The method of claim 29 wherein the discrete memory spaces are non-contiguous.

32. The method of claim 29 wherein the information source includes a database.

33. The method of claim 32 wherein the database includes at least one materialized view.

34. The method of claim 33 wherein the at least one materialized view contains temporal data.

35. The method of claim 29 wherein the indicator is derived from the query.

36. The method of claim 29 wherein the indicator is a function of time.

37. The method of claim 29 wherein the indicator includes a numeral index.

* * * * *